(12) United States Patent
Takenoiri et al.

(10) Patent No.: US 7,592,080 B2
(45) Date of Patent: Sep. 22, 2009

(54) PERPENDICULAR MAGNETIC RECORDING MEDIUM

(75) Inventors: Shunji Takenoiri, Nagano (JP); Yasushi Sakai, Nagano (JP)

(73) Assignee: Fuji Electric Device Technology Co., Ltd., Tokyo (JP)

( * ) Notice: Subject to any disclaimer, the term of this patent is extended or adjusted under 35 U.S.C. 154(b) by 143 days.

(21) Appl. No.: 11/907,118

(22) Filed: Oct. 9, 2007

(65) Prior Publication Data
US 2008/0096055 A1 Apr. 24, 2008

(30) Foreign Application Priority Data
Oct. 12, 2006 (JP) ............ 2006-278580
May 30, 2007 (JP) ............ 2007-143473

(51) Int. Cl.
*G11B 5/66* (2006.01)
(52) U.S. Cl. .................. 428/828.1; 428/831
(58) Field of Classification Search .......... None
See application file for complete search history.

(56) References Cited

U.S. PATENT DOCUMENTS

| | | | |
|---|---|---|---|
| 6,686,070 B1 * | 2/2004 | Futamoto et al. | 428/827 |
| 7,217,467 B2 * | 5/2007 | Arai et al. | 428/828.1 |
| 2002/0058160 A1 | 5/2002 | Oikawa et al. | |
| 2005/0019608 A1 | 1/2005 | Kim et al. | |
| 2005/0129985 A1 | 6/2005 | Oh et al. | |
| 2005/0214588 A1 | 9/2005 | Iwasaki et al. | |
| 2006/0093867 A1 | 5/2006 | Takenoiri et al. | |
| 2006/0141292 A1 | 6/2006 | Iwasaki et al. | |
| 2007/0218317 A1 * | 9/2007 | Kurita et al. | 428/828.1 |

FOREIGN PATENT DOCUMENTS

| | | |
|---|---|---|
| JP | 2002-100030 | 4/2002 |
| JP | 2002-298323 | 10/2002 |
| JP | 2002-358617 | 12/2002 |
| JP | 2003-123239 | 4/2003 |
| JP | 2004-227740 | 8/2004 |
| JP | 2004-272957 | 9/2004 |
| JP | 2004-288348 | 10/2004 |
| JP | 2005-004945 | 1/2005 |

OTHER PUBLICATIONS

Shunji Takenoiri, et al., "Development and Issues of CoPtCr-SiO₂ Perpendicular Recording Media", 135th Topical Symposium Magn. Soc. Jpn. (2004), Abstract.

* cited by examiner

Primary Examiner—Holly Rickman
(74) Attorney, Agent, or Firm—Rabin & Berdo, PC (57) ABSTRACT

A perpendicular magnetic recording medium includes a non-magnetic substrate; a first underlayer provided on the non-magnetic substrate; a first nonmagnetic intermediate layer provided on the first underlayer; a second underlayer provided on the first nonmagnetic intermediate layer; a second nonmagnetic intermediate layer provided on the second underlayer; and a magnetic recording layer provided on the second nonmagnetic intermediate layer, wherein the first underlayer comprises a soft magnetic material which has a face-centered cubic structure and which includes at least Ni and Fe, and wherein the second underlayer comprises a soft magnetic material which has a face-centered cubic structure and which includes at least Co. The orientation dispersion is reduced and crystal grain diameters are smaller in the magnetic recording layer, and the film thickness of nonmagnetic intermediate layers can be decreased so that performance improvements such as reduced noise, increased S/N ratio, and improved write-ability are achieved.

16 Claims, 2 Drawing Sheets

PERPENDICULAR MAGNETIC RECORDING MEDIUM

BACKGROUND OF THE INVENTION

1. Field of the Invention

This invention relates to a perpendicular magnetic recording medium mounted in various magnetic recording devices. More specifically, this invention relates to a perpendicular magnetic recording medium mounted in a hard disk drive (HDD) used as an external storage device of a computer, audio-video equipment, and similar.

2. Description of the Related Art

From 1997 on, there has been a rapid increase, at an annual pace of from 60 to 100%, in HDD recording densities. As a result of such remarkable growth, it is thought that the in-plane recording method that has been used in the past is approaching the limit of high-density recording. Given such circumstances, in recent years there has been much interest in perpendicular recording methods enabling higher recording densities, which has been the subject of much active research and development. And from 2005, at long last, HDDs adopting perpendicular recording methods in some models have been commercialized.

A perpendicular magnetic recording medium principally includes a magnetic recording layer of hard magnetic material; an underlayer to orient the magnetic recording layer in a target direction; a protective film to protect the surface of the magnetic recording layer; and a backing layer of soft magnetic material, which serves to concentrate the magnetic flux generated by a magnetic head used in recording onto the magnetic recording layer.

In order to improve the basic characteristics of the medium, the signal output-to-noise ratio (S/N) must be improved. That is, the signal output from the medium must be increased, and noise must be reduced. One cause of a decrease in signal output and an increase in noise is an increase in orientation dispersion (crystal orientation irregularity) in the magnetic recording layer. In the perpendicular magnetic recording medium, the magnetization easy axis in the magnetic recording layer must be oriented perpendicular to the medium surface. If there is large dispersion in the orientation of this easy axis of magnetization, then the consequent reduction in the perpendicular-direction flux causes a decline in signal output. According to the results of studies by the inventors, in a medium with large orientation dispersion, the magnetic discreteness of crystal grains declines and magnetic cluster sizes increase, and noise is increased (see Shunji Takenoiri et al., "Development and problems of CoPtCr—$SiO_2$ perpendicular media", 135th Topical Symposium Magn. Soc. Jpn. (2004)).

In addition, there have been proposals in the prior art in order to improve the electromagnetic transducing characteristics by improving magnetic characteristics and reducing noise arising in the soft magnetic backing layer. One proposes to use a two-layer underlayer of an alloy of Fe, Cr or Co and Ru as an underlayer or intermediate layer positioned between the magnetic recording layer and the soft magnetic backing layer (see Japanese Patent Laid-open No. 2002-100030, corresponding U.S. patent application 2002/0058160A1, corresponding Singapore patent application 91345A1). Another proposes to use a CoFe alloy soft magnetic backing layer and Ru underlayer (see Japanese Patent Laid-open No. 2002-298323).

It has further been proposed to use a soft magnetic Permalloy material as an underlayer, and to use Ru or a Ru-base alloy as a comparatively thick nonmagnetic intermediate layer, so that orientation dispersion in the magnetic recording layer can be reduced, the initial growth layer can be decreased, crystal grain diameters can be reduced, and similar (see Japanese Patent Laid-open Nos. 2002-358617 and 2003-123239). Further, it has been proposed, when using a soft magnetic Permalloy material underlayer and an Ru or Ru-base alloy material intermediate layer, to insert a soft magnetic Co layer or a soft magnetic Co-base alloy layer between the underlayer and intermediate layer. In this way, the film thickness of the intermediate layer can be reduced, and at the same time the coercive force and squareness ratio of the magnetic recording layer can be increased, and the S/N at recording densities used in the prior art can be improved (see Japanese Patent Laid-open No. 2004-288348).

However, there remains a need for the perpendicular magnetic recording medium which affords high signal output and low noise even during high-density recording to attain a higher S/N, in keeping with trends toward still higher recording densities. In order to realize a higher S/N through increased signal output and reduced noise of the perpendicular magnetic recording medium, it is necessary that the orientation dispersion of the magnetic recording layer be reduced as much as possible.

In addition to the above points, in order to lower noise in the magnetic recording medium, it is necessary to decrease the crystal grain diameters in the magnetic recording layer. If the crystal grain diameters in the magnetic recording layer are large, then bit transition regions become irregular, and transition noise increases. Hence in order to reduce the transition noise it is necessary to reduce the crystal grain diameters, and to make the bit transition regions linear.

From the standpoint of raising the recording density of the perpendicular magnetic recording medium as well, it is necessary to reduce noise in bit transition regions. To this end, securing sharp recording magnetic fields and making transitions as linear as possible are effective. In order to obtain a sharp recording magnetic field, the distance between the soft magnetic backing layer and the magnetic head must be made as small as possible. Further, because the recording magnetic field of the magnetic head declines as the recording density rises, the distance between the soft magnetic backing layer and the magnetic head must also be reduced in order to secure an adequate recording magnetic field.

In general, a nonmagnetic underlayer or an intermediate layer is provided between the magnetic recording layer and the soft magnetic backing layer. At present, however, the nonmagnetic underlayer or intermediate layer is thick, at a film thickness of approximately 20 to 30 nm, and is a factor increasing the distance between the soft magnetic backing layer and the magnetic head. In actuality, in currently proposed configurations as described above, the nonmagnetic underlayer or intermediate layer is very thick (for example, 35 nm or larger in the configurations of Japanese Patent Laid-open No. 2002-100030, corresponding U.S. patent application 2002/0058160A1, corresponding Singapore patent application 91345A1, and Japanese Patent Laid-open No. 2002-298323). Such a thick underlayer or intermediate layer is inadequate for shortening the distance between the magnetic head and the soft magnetic backing layer and obtaining a high S/N in high-density recording.

Further, the underlayer or intermediate layer also functions to control the crystallinity, orientation, and crystal grain diameters in the magnetic recording layer formed thereupon, and affects the characteristics of the magnetic recording layer. In particular, when the magnetic recording layer is formed by epitaxial growth on the underlayer or intermediate layer, the crystal grain diameters of the magnetic recording layer material conform to the crystal grain diameters of the material in the underlayer or intermediate layer. Hence in order to reduce the crystal grain diameters in the magnetic recording layer material, it is effective to reduce the crystal grain diameters in the underlayer or intermediate layer. However, when the film thickness of the underlayer or intermediate layer is reduced, not only a lessening of the crystal orientation of the magnetic recording layer material, but also impediments to the magnetic isolation between magnetic crystal grains occur. Accordingly, the magnetic characteristics of the magnetic recording layer decline. In light of these facts, rather than simply reducing the film thickness of the underlayer or intermediate layer, it is necessary to maintain or improve the magnetic characteristics of the magnetic recording layer while simultaneously reducing the film thickness.

Hence an object of this invention is to provide a perpendicular magnetic recording medium in which, simultaneously with reduction of the orientation dispersion of and shrinking of crystal grain diameters in the magnetic recording layer, the film thickness of the underlayer or intermediate layer can be reduced, and by this means performance improvements such as reduced noise, an improved S/N, and improved write-ability are made possible.

SUMMARY OF THE INVENTION

In light of these circumstances, as the result of assiduous researches by the inventors, it was discovered that, by sequential layering of a first underlayer, a first nonmagnetic intermediate layer, a second underlayer, and a second nonmagnetic intermediate layer, by dividing the nonmagnetic intermediate layer into two layers, and by using as the first and second underlayer materials a soft magnetic material having a face-centered cubic (fcc) structure, the film thickness of the second nonmagnetic intermediate layer could be reduced to 0.1-20 nm to secure a sharp recording material field. The medium performance could simultaneously be improved in such respects as reduced noise, improved S/N, and improved write-ability of the perpendicular magnetic recording medium, culminating in the completion of this invention.

A perpendicular magnetic recording medium of this invention is formed by layering sequentially, on a nonmagnetic substrate, a soft magnetic backing layer, first underlayer, first nonmagnetic intermediate layer, second underlayer, second nonmagnetic intermediate layer, magnetic recording layer, protective film, and liquid lubricant layer, wherein the first underlayer comprises a soft magnetic material which has a face-centered cubic (fcc) structure and which comprises at least Ni and Fe, and the second underlayer comprises a soft magnetic material which has a face-centered cubic (fcc) structure and which comprises at least Co. Here, taking as reference the total number of atoms constituting the first underlayer, it is desirable that the first underlayer comprises 30-88 at % (i.e., "at %" is intended to stand for atom % or atomic %) Ni and 0.1-22 at % Fe. Moreover, the first underlayer may further comprise at least one material selected from among Co, Si, B, Nb, N, Ta, Al, Pd, Cr, and Mo.

The first nonmagnetic intermediate layer in this invention may include a metal selected from the group consisting of V, Cr, Cu, Nb, Mo, Ru, Rh, Ta, W, Re, and Ir, or an alloy the main constituent of which is at least one metal selected from the group consisting of V, Cr, Cu, Nb, Mo, Ru, Rh, Ta, W, Re, and Ir. Here, it is desirable that the film thickness of the first nonmagnetic intermediate layer be between 0.1 nm and 2 nm. Also, the first nonmagnetic intermediate layer in this invention may include a nonmagnetic alloy including at least Co. In this case, it is desirable that the film thickness of the first nonmagnetic intermediate layer be between 3 nm and 15 nm.

The second underlayer in this invention may further include at least one material selected from the group consisting of Fe, B, Al, Zr, Mg, and Si. Here, taking as reference the total number of atoms constituting the second underlayer, it is desirable that the second underlayer include 10 at % or less Fe, 50 at % or less B, 40 at % or less Al, 15 at % or less Zr, 52 at % or less Mg, or 33 at % or less Si. Further, the second underlayer may include one type of material selected from the group consisting of O and N.

The second nonmagnetic intermediate Layer in this invention can comprise Ru or a Ru-base alloy. Also, it is preferable that the film thickness of the second nonmagnetic intermediate layer range between 0.1 nm and 20 nm. The magnetic recording layer in this invention may include a material having a granular structure in which magnetic crystal grains are dispersed in a matrix of a nonmagnetic oxide or a nonmagnetic nitride.

By adopting the above-described configuration, the film thickness of the second nonmagnetic intermediate layer is reduced to between 0.1 nm and 20 nm, the orientation dispersion and crystal grain diameters in the magnetic recording layer are reduced, and magnetic isolation of magnetic crystal grains in the magnetic recording layer can be promoted. As a result, reduction of medium noise and improvement of the S/N, and improvement of write-ability through reduction of the distance between the soft magnetic film and magnetic head, can be achieved simultaneously. Further, by reducing the thickness of the nonmagnetic intermediate layer, costs can simultaneously be lowered.

BRIEF DESCRIPTION OF THE DRAWINGS

These and other aspects of the invention may better be understood from the following detailed description of preferred embodiments with reference to the accompanying drawings in which.

DESCRIPTION OF THE PREFERRED EMBODIMENTS

Figure 1:
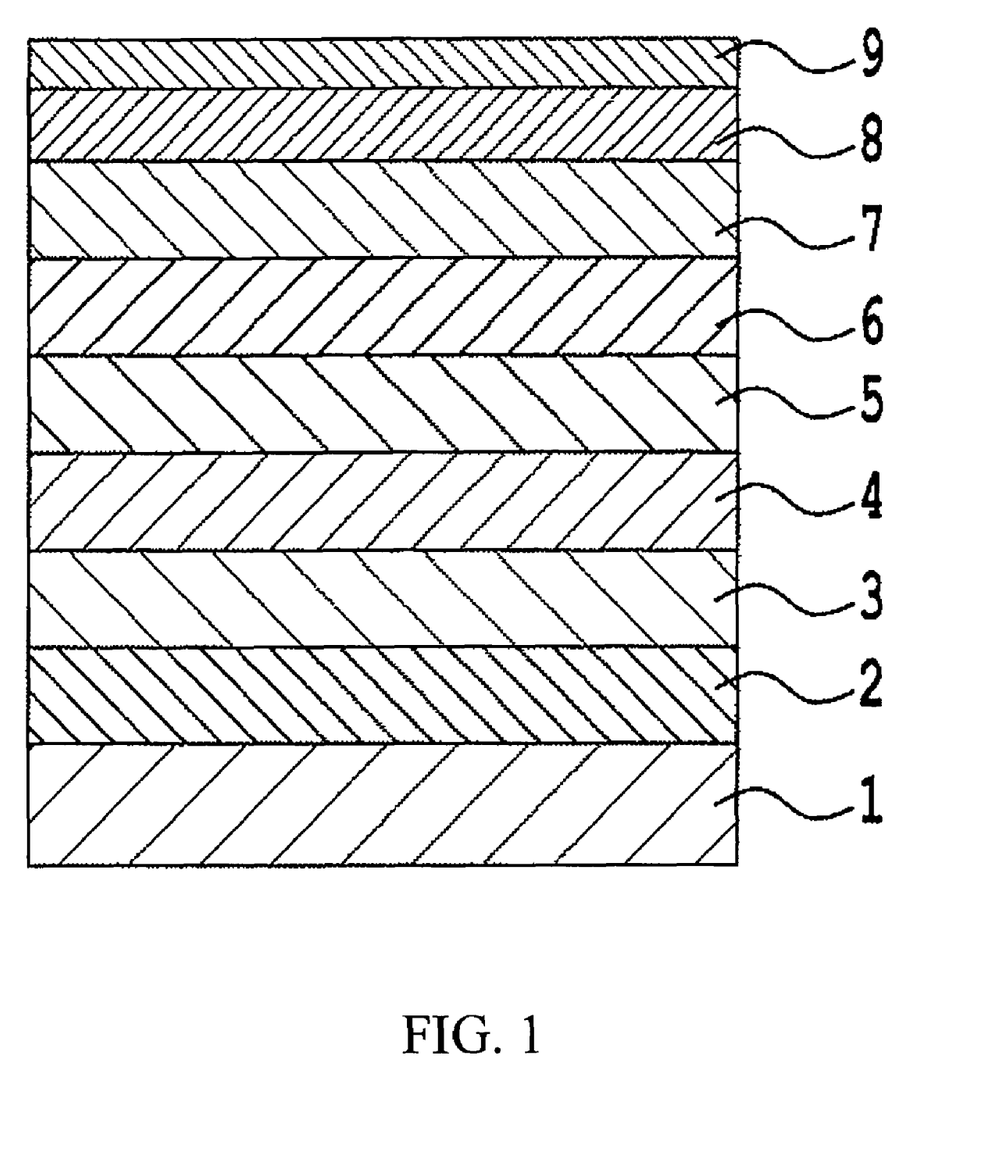
FIG. 1 is a cross-sectional schematic diagram of a perpendicular double-layer magnetic recording medium of this invention.

Below, preferred aspects of the invention are explained referring to the drawings. FIG. 1 is a schematic cross-sectional view used to explain a perpendicular recording medium of the invention. As shown in FIG. 1, a perpendicular magnetic recording medium of this invention has a nonmagnetic base 1, a soft magnetic backing layer 2, a first underlayer 3, a first nonmagnetic intermediate layer 4, a second underlayer 5, a second nonmagnetic intermediate layer 6, a magnetic recording layer 7, a protective layer 8, and a liquid lubricant layer 9.

As the nonmagnetic base 1, various substrates with flat surfaces, well-known in this technical field, can be used. For example, an NiP-plated Al alloy, reinforced glass, crystallized glass, or similar, used in magnetic recording media, can be employed as the nonmagnetic base 1.

As the soft magnetic backing layer 2, FeTaC, Sendust (FeSiAl) alloy, or other crystalline materials, as well as CoZrNb, CoTaZr, or other nonmagnetic materials including a Co alloy, can be used. Although the optimum value varies depending on the structure and characteristics of the magnetic head used in recording, it is desirable that the film thickness of the soft magnetic backing layer 2 be approximately between 10 nm and 500 nm, determined in conjunction with manufacturing considerations.

The first underlayer 3 can be formed using a soft magnetic material having a face-centered cubic (fcc) structure, including at least Ni and Fe. It is desirable that the first underlayer include 30-88 at % Ni and 0.1-22 at % Fe, where the total number of atoms constituting the first underlayer is taken as reference. By using a soft magnetic material including, in addition to Ni and Fe, at least one material selected from the group consisting of Co, Si, B, Nb, N, Ta, Al, Pd, Cr, and Mo, the soft magnetic characteristics of the first underlayer 3 can be improved, and the crystal grain diameters can be made smaller. Similarly to the soft magnetic backing layer, the first underlayer 3 has the function of guiding the magnetic field generated by the magnetic head to the magnetic recording layer 7, and so the film thickness does not pose any problems in particular with respect to function. However, as the film thickness is increased the crystal grain diameters grow, and so considering transition noise and other aspects of magnetic recording media performance, a film thickness between 1 nm and 20 nm is desirable. It is still more preferable that the thickness be between 3 nm and 10 nm.

The first nonmagnetic intermediate layer 4 can be formed using a metal selected from the group consisting of V, Cr, Cu, Nb, Mo, Ru, Rh, Ta, W, Re, and Ir, or using an alloy the main components of which are these metals. By providing the first nonmagnetic intermediate layer 4, the crystallinity and orientation of the magnetic recording layer 7 are improved. Moreover, there is almost no impediment to the medium write-ability upon reducing the film thickness despite the fact that a nonmagnetic material is used. In order to exploit such a characteristic to the maximum extent, it is preferable that the film thickness of the first nonmagnetic intermediate layer 4 be between 0.1 nm and 2 nm.

Further, the first nonmagnetic intermediate layer 4 can be formed using a nonmagnetic alloy including at least Co. For example, CoCr, CoCrMn, CoNiFeMn, CoCrFeBN, and similar can be used. However, alloys that can be used are not limited to these. By providing the first nonmagnetic intermediate layer 4 including a nonmagnetic alloy including Co, the crystallinity and orientation of the magnetic recording layer 7 are improved, similarly to the above description. In this case, however, by making the film thickness 3 nm or greater, the effect can be further enhanced. When the film thickness of the first nonmagnetic intermediate layer is increased, there is a concern that the write-ability of the medium may be impeded. However, the write-ability is impeded hardly at all at high recording densities, because during high-density recording the second underlayer serves as a soft magnetic backing layer. However, because even in high-density recording media the write-ability must be considered during recording at low densities, as in the case of servo signals, when forming the first nonmagnetic intermediate layer 4 using a nonmagnetic alloy including Co, it is preferable that the film thickness be between 3 nm and 15 nm.

The second underlayer 5 can be formed using soft magnetic material having the fcc structure and including Co. This is because in the case of material having a hexagonal close-packed (hcp) structure, a uniaxial anisotropy appears, and soft magnetic properties cannot be obtained. Further, in the case of a body-centered cubic (bcc) structure, epitaxial growth of the second nonmagnetic intermediate layer formed thereupon is difficult. By using a soft magnetic material including, in addition to Co, at least one material selected from the group consisting of Fe, B, Al, Zr, Mg, and Si, the soft magnetic properties of the second underlayer 5 can be further improved, and at the same time crystal grain diameters can be reduced. In order to maintain the fcc structure while realizing soft magnetic properties, it is preferable that appropriate amounts of these materials be added. When the total number of atoms constituting the second underlayer 5 is taken as reference, it is desirable that the second underlayer include 10 at % or less Fe, 50 at % or less B, 40 at % or less Al, 15 at % or less Zr, 52 at % or less Mg, and 33 at % or less Si. Further, the second underlayer 5 may include one material selected from the group consisting of O and N. By including O or N in the second underlayer 5, the crystal grain diameters in the second underlayer 5 can be reduced. In order to add O or N to the second underlayer 5, addition of oxygen or nitrogen during film deposition is effective. When adding oxygen, it is desirable that the amount of oxygen contained in the film deposition gas be 5% or less, and more preferably approximately 1%. When adding nitrogen, it is desirable that the amount of nitrogen contained in the film deposition gas be 10% or less, and more preferably approximately 5%. It is desirable that the film thickness of the second underlayer 5 be adjusted such that the magnetic recording layer magnetic characteristics and electromagnetic transducing characteristics are optimum. In addition, in consideration of the fact that crystal grain diameters increase in size with increasing film thickness, and in light of manufacturing considerations, it is desirable that the film thickness of the second underlayer 5 be between 2 nm and 15 nm.

The second nonmagnetic intermediate layer 6 can be formed using Ru or an alloy the main component of which is Ru; but other materials may be used as well. The second nonmagnetic intermediate layer 6 has a film thickness in the range between 0.1 nm and 20 nm, and preferably between 1 nm and 10 nm. By employing a film thickness in this range, characteristics necessary for high-density recording can be imparted to the magnetic recording layer 7, without degrading the magnetic characteristics or electromagnetic transducing characteristics of the magnetic recording layer 7.

It is preferable that the magnetic recording layer 7 be formed using a ferromagnetic alloy including at least Co and Pt. In order to use the magnetic recording medium of this invention as a perpendicular magnetic recording medium, the magnetization easy axis (the c axis in a hexagonal close-packed (hcp) structure) of the material of the magnetic recording layer 7 must be oriented in the direction perpendicular to the surface of the nonmagnetic substrate 1. For example, single-layer films of such alloy materials as CoPt, CoCrPt, CoCrPtB, CoCrPtTa, or similar, as well as multilayer films such as [Co/Pt]$_n$ and [Co/Pd]n, can be used as the magnetic recording layer 7.

It is preferable that a single-layer or multilayer magnetic recording layer 7 be formed using a material having a granular structure in which magnetic crystal grains are dispersed in a nonmagnetic oxide or nonmagnetic nitride matrix. Materials having the granular structure include CoPt—SiO$_2$, CoCrPtO, CoCrPt—SiO$_2$, CoCrPt—Al$_2$O$_3$, CoPt—AlN, and CoCrPt—Si$_3$N$_4$, but other materials can be used. In this invention, by using materials having the granular structure, magnetic isolation between proximate magnetic crystal grains in the magnetic recording layer 7 is promoted, so that improvements to the medium characteristics such as noise reduction, SNR improvement, and enhanced recording resolution are possible. No limitations in particular are placed on the film thickness of the magnetic recording layer 7. However, from the standpoints of productivity and high-density recording properties, it is preferable that the magnetic recording layer 7 have a film thickness of 30 nm or less, and more preferably 15 nm or less.

The protective film 8 is a layer provided to protect the underlying magnetic recording 7 and each of the lower constituent layers; for example, a thin film the main component of which is carbon can be used. In addition, the protective film 8 can be formed using various thin film materials known as materials of protective films for magnetic recording media in this technical field.

The liquid lubricant layer 9 is a layer which imparts lubrication when the recording/readout head flies above or comes into contact with the magnetic recording medium. For example, perfluoropolyether liquid lubricants, or the various liquid lubricant materials known in this technical field, can be used.

Each of the layers on the nonmagnetic substrate 1 can be formed by various film deposition techniques normally used in the field of magnetic recording media. For example, sputtering methods (DC magnetron sputtering, RF magnetron sputtering, and other methods), vacuum evaporation deposition methods, and other methods can be used to form each of the layers from the soft magnetic backing layer 2 to the protective film 8. In formation of a protective film 8 the main component of which is carbon, in addition to the above methods, a plasma CVD method can also be used. On the other hand, the liquid lubricant layer 9 can be formed using, for example, a dipping method, a spin-coating method, or similar.

In perpendicular magnetic recording media of this invention, by using material having the fcc structure as the first underlayer 3, the crystal orientation is improved in the nonmagnetic intermediate layer and similar formed thereupon, and at the same time crystal grain diameters can be reduced. Through these advantageous results, even when the film thickness of the nonmagnetic intermediate layer is decreased, the magnetic characteristics and electromagnetic transducing characteristics of the magnetic recording layer 7 can be maintained.

In addition, by dividing the nonmagnetic intermediate layer into the first nonmagnetic intermediate layer 4 and the second nonmagnetic intermediate layer 6, in a structure in which the second underlayer 5 is interposed therebetween, a magnetic recording medium of this invention can attain the following three advantageous results.

First, by performing film deposition intermittently rather than continuously, crystal growth can be suppressed. In this invention, through the formation of three layers, i.e., the first nonmagnetic intermediate layer 4, the second underlayer 5, and the second nonmagnetic intermediate layer 6, crystal growth in each of these layers can be suppressed, and crystal grain diameters can be made small. This advantageous result acts synergistically with the advantageous result of reduction of the crystal grain diameters in the above-described first underlayer 3 to reduce the crystal grain diameters in the magnetic recording layer 7, enabling high-density recording.

Second, by employing a soft magnetic material having the fcc structure as the second underlayer 5, epitaxial growth of the second nonmagnetic intermediate layer 6 becomes possible. In contrast, if a material with the bcc structure is used as the second underlayer 5, the above-described epitaxial growth is difficult. From the standpoint of crystal growth, using epitaxial growth, insertion of the second underlayer 5 has the same effect as increasing the film thickness of the nonmagnetic intermediate layer. As a result, the orientation dispersion of the magnetic recording layer can be reduced. By reducing the orientation dispersion, the magnetization easy axis in the magnetic recording layer is arranged in a single direction (in the direction perpendicular to the surface of the nonmagnetic substrate 1), so that the signal output obtained can be increased. Further, reducing the orientation dispersion is equivalent to having the crystal grains in the magnetic recording layer grow in a single direction; consequently joining of adjacent magnetic crystal grains occurs less frequently, and magnetic isolation of magnetic crystal grains is promoted. By promoting magnetic isolation of magnetic crystal grains in the magnetic recording layer 7, medium noise can be reduced.

Third, by forming the second underlayer 5 using an fcc structure material, it is easy to impart soft magnetic properties to the second underlayer 5. On the other hand, if for example a material having the hcp structure were used, a uniaxial magnetic anisotropy would appear, and soft magnetic properties could not be easily obtained. By inserting the second underlayer 5 having soft magnetic properties between the first nonmagnetic intermediate layer 4 and the second nonmagnetic intermediate layer 6, the distance between the soft magnetic film and magnetic head (in this invention, the distance between the second underlayer 5 and the magnetic head, and not the distance between the soft magnetic backing layer 2 and the magnetic head) is shortened, and write-ability of the magnetic recording medium is improved. In addition, a sharp recording magnetic field is obtained in bit transition regions, and transition noise in these regions can be reduced. Further, the configuration of this invention achieves the above-described advantageous results without problems arising from reduction of the thickness of other constituent layers of the magnetic recording medium (for example, reduced reliability due to the thinness of the protective layer, reduced thermal stability due to the thinness of the magnetic recording layer, worsened medium characteristics due to the thinness of the nonmagnetic intermediate layers, and similar).

By means of the above advantageous results, perpendicular magnetic recording media of this invention achieves a high signal output and low noise even during high-density recording, and can attain a high S/N and high write-ability.

EMBODIMENTS

Embodiment 1

As the nonmagnetic substrate 1, a chemically reinforced glass substrate with a smooth surface (N-5 glass substrate manufactured by HOYA Corporation) was used; after cleaning, the substrate was placed in a DC magnetron sputtering system, and a Co3Zr5Nb target (taking as reference the total number of atoms, 3 at % Zr, 5 at % Nb, remainder Co; similarly hereafter) was used in an Ar gas atmosphere at a pressure of 0.67 Pa to deposit a CoZrNb amorphous soft magnetic backing layer 2 of film thickness 60 nm. Next, a Co35Ni4Fe2Si target was used in an Ar gas atmosphere at 0.67 Pa to deposit a CoNiFeSi first underlayer 3 of film thickness 6 nm. The CoNiFeSi film obtained has the fcc structure. Next, a Ru target was used in an Ar gas atmosphere at a pressure of 0.67 Pa to deposit a Ru first nonmagnetic intermediate layer 4 of thickness 0.7 nm. Then, in an Ar-4% $N_2$ gas atmosphere at pressure 0.67 Pa, a Co4Fe target was used to deposit a CoFe—N second underlayer 5 of thickness 6 nm. The CoFe—N film obtained has the fcc structure. Then, a Ru target was used in an Ar gas atmosphere at a pressure of 4.0 Pa to deposit a Ru second nonmagnetic intermediate layer 6 of thickness 8 nm. Then a two-layer magnetic recording layer 7 was deposited. Initially, a 90(Co12Cr16Pt)-10SiO$_2$ target was used at a pressure of 5.3 Pa to deposit a CoCrPt—SiO$_2$ first magnetic recording layer of film thickness 8 nm, and then a 96(Co20Cr12Pt)-4SiO$_2$ target was used at a pressure of 1.2 Pa to deposit a CoCrPt—SiO$_2$ second magnetic recording layer of film thickness 8 nm, to obtain a magnetic recording layer 7 with a total film thickness of 16 nm. Next, at a pressure of 0.13 Pa, the plasma CVD method was employed using ethylene as a material gas to deposit a carbon protective film 8 of thickness 4 nm, after which the sample was removed from the vacuum chamber. Finally, a dipping method was used to form a perfluoropolyether liquid lubricant layer 9 of thickness 2 nm, to obtain the perpendicular magnetic recording medium.

Embodiment 2

Except for using a Ni12Fe4Si target to deposit an NiFeSi first underlayer 3 of thickness 6 nm, the same method as in Embodiment 1 was repeated to manufacture the perpendicular magnetic recording medium. Here, the NiFeSi film obtained had the fcc structure.

Embodiment 3

Except for using a Ru target to deposit a Ru first nonmagnetic intermediate layer 4 of thickness 1.6 nm, the same method as in Embodiment 1 was repeated to manufacture the perpendicular magnetic recording medium.

Embodiment 4

Except for using a Cu target to deposit a Cu first nonmagnetic intermediate layer 4 of thickness 0.6 nm, the same method as in Embodiment 1 was repeated to manufacture the perpendicular magnetic recording medium.

Embodiment 5

Except for using a Co6B target in an Ar-1% O$_2$ gas atmosphere at a pressure of 0.89 Pa to deposit a CoB—O second underlayer 5 of thickness 6 nm, the same method as in Embodiment 1 was repeated to manufacture the perpendicular magnetic recording medium. The CoB—O film obtained had the fcc structure.

Embodiment 6

Except for using a Co25Cr30Mn target in an Ar gas atmosphere at a pressure of 1.3 Pa to deposit a CoCrMn first nonmagnetic intermediate layer 4 of thickness 5 nm, the same method as in Embodiment 1 was repeated to manufacture the perpendicular magnetic recording medium.

Embodiment 7

Except for using a Co17Ni2Fe50Mn target in an Ar gas atmosphere at a pressure of 0.67 Pa to deposit a CoNiFeMn first nonmagnetic intermediate layer 4 of thickness 10 nm, the same method as in Embodiment 1 was repeated to manufacture the perpendicular magnetic recording medium.

Embodiment 8

Except for using a Co32Cr4Fe2B target in an Ar-1.8% N$_2$ gas atmosphere at a pressure of 2.6 Pa to deposit a CoCrFeB—N first nonmagnetic intermediate layer 4 of thickness 10 nm, the same method as in Embodiment 1 was repeated to manufacture the perpendicular magnetic recording medium.

COMPARISON EXAMPLE 1

Except for not depositing the first underlayer 3, the same method as in Embodiment 1 was repeated to manufacture the perpendicular magnetic recording medium.

COMPARISON EXAMPLE 2

Except for not depositing the first nonmagnetic intermediate layer 4, the same method as in Embodiment 1 was repeated to manufacture the perpendicular magnetic recording medium.

COMPARISON EXAMPLE 3

Except for not depositing the first nonmagnetic intermediate layer 4 or the second underlayer 5, and setting the film thickness to 15 nm for the Ru second nonmagnetic intermediate layer 6, the same method as in Embodiment 1 was repeated to manufacture the perpendicular magnetic recording medium.

Evaluations

The perpendicular magnetic recording media obtained in the above-described embodiments and comparison examples were subjected to measurements of coercivity H$_c$ using a Kerr effect measurement device. In addition, a read/write tester was used to measure the media noise, S/N, and overwrite (OW) characteristics. Evaluations of media noise and S/N were performed at a recording density of 510 kfci. Media noise is shown normalized by the signal output. OW was measured by initially recording first signals on a track at a recording density of 510 kfci, measuring the signal output (T1) for the signals, and then overwriting the same track with second signals at a recording density of 68 kfci, measuring the residual signal output of the overwritten first signals (T2), and using the following Equation 1 to obtain values used for evaluation.

$$OW = 20 \times \log(T2/T1)(\text{units: dB}) \qquad \text{[Equation 1]}$$

(where "log" indicates the common logarithm).

This overwriting OW in which signals recorded at high density are overwritten with signals recorded at low density is called reverse overwriting, and is an index enabling clear evaluation of write-ability for the perpendicular magnetic recording medium.

In addition, crystal grain diameters of the magnetic recording layer 7 were evaluated based on images observing the plane using a transmission electron microscope (TEM). Also, X-ray diffractometer (XRD) equipment was used to measure the rocking curve of the CoCrPt (002) peak in the magnetic recording layer 7, and the peak half-maximum width was taken to indicate the orientation dispersion ($\Delta\theta_{50}$).

Table 1 shows the layer configuration of the perpendicular magnetic recording media of embodiments 1 through 8 and comparison examples 1 through 3. Table 2 presents the values of H$_c$, electromagnetic transducing characteristics (S/N, media noise (normalized values), OW), and the crystal grain diameters and $\Delta\theta_{50}$ of the magnetic recording layer 7, for the embodiments 1 through 8 and comparison examples 1 through 3.

TABLE 1

Table 1: Layer configuration of perpendicular magnetic recording media

| | First underlayer | | First nonmagnetic intermediate layer | | Second underlayer | | second nonmagnetic intermediate layer |
| --- | --- | --- | --- | --- | --- | --- | --- |
| | Material | Thickness (nm) | Material | Thickness (nm) | Material | Thickness (nm) | Thickness (nm) |
| Embodiment 1 | CoNiFeSi | 6 | Ru | 0.7 | CoFe—N | 6 | 8 |
| Embodiment 2 | NiFeSi | 6 | Ru | 0.7 | CoFe—N | 6 | 8 |
| Embodiment 3 | CoNiFeSi | 6 | Ru | 1.6 | CoFe—N | 6 | 8 |
| Embodiment 4 | CoNiFeSi | 6 | Cu | 0.6 | CoFe—N | 6 | 8 |
| Embodiment 5 | CoNiFeSi | 6 | Ru | 0.7 | CoB—O | 6 | 8 |
| Embodiment 6 | CoNiFeSi | 6 | CoCrMn | 5 | CoFe—N | 6 | 8 |
| Embodiment 7 | CoNiFeSi | 6 | CoNiFeMn | 10 | CoFe—N | 6 | 8 |
| Embodiment 8 | CoNiFeSi | 6 | CoCrFeB—N | 10 | CoFe—N | 6 | 8 |
| Comparison example 1 | — | — | Ru | 0.7 | CoFe—N | 6 | 8 |
| Comparison example 2 | CoNiFeSi | 6 | — | — | CoFe—N | 6 | 8 |
| Comparison example 3 | CoNiFeSi | 6 | — | — | — | — | 15 |

TABLE 2

Table 2: Evaluation of perpendicular magnetic recording media

| | Magnetic characteristics $H_c$ (Oe) | Electromagnetic transducing characteristics | | | Magnetic recording layer | |
| --- | --- | --- | --- | --- | --- | --- |
| | | S/N (dB) | Media noise (normalized) | OW (dB) | Crystal grain diameter (nm) | $\Delta\theta_{50}$ (deg) |
| Embodiment 1 | 4842 | 10.06 | 30.69 | −36.42 | 5.4 | 2.988 |
| Embodiment 2 | 4722 | 9.89 | 32.42 | −35.25 | 5.3 | 3.238 |
| Embodiment 3 | 4898 | 10.35 | 29.75 | −34.91 | 5.4 | 2.938 |
| Embodiment 4 | 4689 | 9.81 | 32.82 | −35.93 | 5.4 | 3.349 |
| Embodiment 5 | 4758 | 9.98 | 31.81 | −36.7 | 5.2 | 3.155 |
| Embodiment 6 | 4885 | 10.52 | 28.03 | −34.53 | 5.2 | 3.133 |
| Embodiment 7 | 4804 | 10.65 | 27.59 | −33.81 | 5.2 | 3.108 |
| Embodiment 8 | 4833 | 10.64 | 27.58 | −33.44 | 5.1 | 2.965 |
| Comparison example 1 | 3007 | 6.55 | 45.02 | −46.05 | 7.4 | 9.401 |
| Comparison example 2 | 4635 | 8.72 | 38.47 | −36.46 | 5.9 | 3.673 |
| Comparison example 3 | 4836 | 9.26 | 34.89 | −27.49 | 5.4 | 3.453 |

First, embodiments 1 through 5 and comparison examples 2 and 3, which have a first underlayer, are compared with comparison example 1 that has no first underlayer. As shown in Table 2, in the perpendicular magnetic recording medium of comparison example 1, the orientation dispersion ($\Delta\theta_{50}$) of the magnetic recording layer is greatly increased, and moreover the crystal grain diameters in the magnetic recording layer are similarly increased. And, in comparison example 1 the coercive force $H_c$ of the magnetic recording medium is sharply reduced, and there is prominent degradation of the electromagnetic transducing characteristics, including a lower S/N ratio and increased media noise. From the above results, it is clear that the first underlayer is important for reduction of the orientation dispersion and decreased crystal grain diameters in the magnetic recording layer, and is effective in improving the electromagnetic transducing characteristics of the perpendicular magnetic recording medium. Further, the perpendicular magnetic recording media of embodiments 1 and 2 have equivalent crystal structures in the magnetic recording layer, despite the different materials of the first underlayer, and moreover exhibit equivalent coercivity and electromagnetic transducing characteristics as perpendicular magnetic recording media. From these comparisons it is seen that it is important that Ni and Fe be used as the material of the first underlayer.

Figure 2:
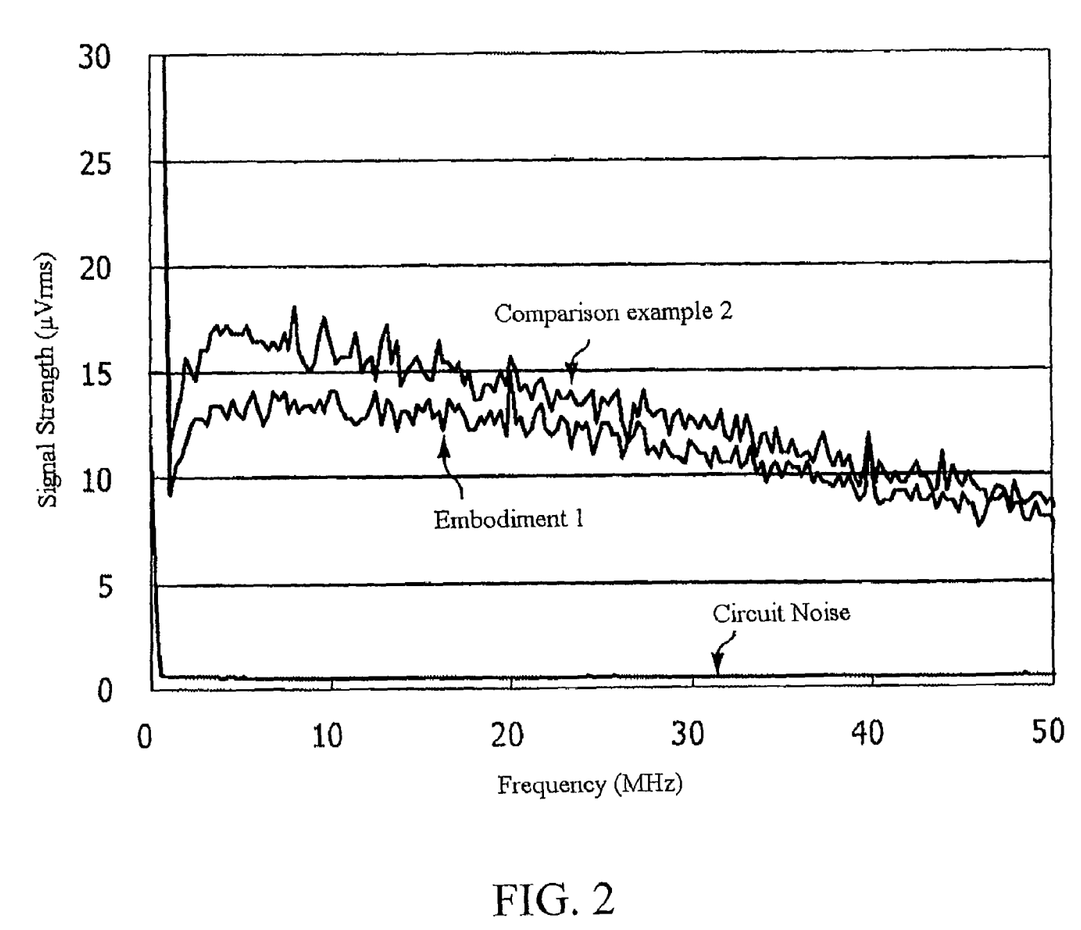
FIG. 2 shows the frequency spectrum of the perpendicular double-layer magnetic media of embodiment 1 and of comparison example 2.

Next, embodiments 1 through 5, having a comparatively thin first nonmagnetic intermediate layer, are compared with comparison example 2, having no first nonmagnetic intermediate layer. The perpendicular magnetic recording medium of comparison example 2 has an equal or somewhat lower coercive force $H_c$ and somewhat increased orientation dispersion ($\Delta\theta_{50}$) compared with embodiments 1 through 5. However, the media noise is increased and the S/N is decreased. One reason for this is thought to be the increased crystal grain diameters in the magnetic recording layer. The crystal grain diameters in the magnetic recording layer of comparison example 2 are increased by approximately 10% over the crystal grain diameters in embodiments 1 through 5, and as a result, it is thought, media noise is increased. Another cause may be the fact that the second underlayer, having soft magnetic properties, was layered directly on the first underlayer, with soft magnetic properties. FIG. 2 shows the low-frequency components of the frequency spectrum of the perpendicular magnetic recording media of embodiment 1 and comparison example 2 when signals are recorded at a recording density of 510 kfci. The frequency spectrum is the result of Fourier conversion of the signal output and plotting against frequency; the output other than that at 120 MHz (equivalent to 510 kfci) and at frequencies which are integral multiples thereof is all noise. The perpendicular magnetic recording media of embodiments 2 through 5 exhibited frequency spectra equivalent to that of embodiment 1. As is clear from FIG. 2, the perpendicular magnetic recording media of comparison example 2 has increased noise at low frequencies compared with embodiment 1. Further, in this technical field, it is known that low-frequency noise arises in the soft magnetic layer. Taking into consideration the differences in layer configuration of embodiment 1 and comparison example 2, it is thought that the layering in direct contact of the first underlayer and second underlayer, which have soft magnetic properties, is one factor causing the increase in noise. From the above results it is seen that not only is the first nonmagnetic intermediate layer effective for reducing the crystal grain diameters in the magnetic recording layer, but separation of the first underlayer and second underlayer with soft magnetic properties is effective for reducing media noise, improving the S/N, and improving other electromagnetic transducing characteristics.

Next, embodiments 6 through 8, having comparatively thick first nonmagnetic intermediate layers, and embodiments 1 through 5, with thin first nonmagnetic intermediate layers, are compared with comparison example 2 that has no first nonmagnetic intermediate layer. The perpendicular magnetic recording media of embodiments 6 through 8 have coercivity $H_c$ and $\Delta\theta_{50}$ values equal to those of embodiments 1 through 5. And compared with comparison example 2, the coercivity $H_c$ is somewhat high, and the $\Delta\theta_{50}$ value is somewhat low. The reason for the lower media noise and higher S/N in embodiments 6 through 8 compared with comparison example 2 is thought to be that, entirely similarly to the cases of embodiments 1 through 5 explained above, crystal grain diameters are reduced and the noise arising from the soft magnetic backing layer is reduced. Here, comparing embodiments 6 through 8 with embodiments 1 through 5, despite the fact that the crystal grain diameters and $\Delta\theta_{50}$ values are equal, in embodiments 6 through 8 media noise is lower, and a higher S/N is obtained. The reason for this is inferred to be that, while the crystal grain diameters in the magnetic layer are unchanged, magnetic isolation is further promoted. Focusing on the OW value, in embodiments 6 through 8 the values are somewhat lower compared with embodiments 1 through 5 and comparison example 2, but the amounts of decrease are small, and values below −30 dB are not obtained, so that the write-ability can be judged to be adequate. From the above results it is clear that even when a comparatively thick first nonmagnetic intermediate layer is used, write-ability is not impeded, and improvements in medium characteristics such as reduced media noise and a higher S/N can be attained.

Next, embodiments 1 through 5, having a second underlayer, are compared with comparison example 3, not having a second underlayer. The perpendicular magnetic recording medium of comparison example 3 has coercivity $H_c$ equal to that of embodiments 1 through 5, and also has approximately the same crystal grain diameters and orientation dispersion ($\Delta\theta_{50}$) of the magnetic recording layer. The perpendicular magnetic recording medium of comparison example 3 is not divided by a second underlayer, and has a single nonmagnetic intermediate layer (second nonmagnetic intermediate layer) with film thickness equivalent to the total of the film thicknesses of the first nonmagnetic intermediate layer, second underlayer, and second nonmagnetic intermediate layer in embodiments 1 through 5. By increasing the film thickness of the nonmagnetic intermediate layers, the magnetic characteristics ($H_c$) of the perpendicular magnetic recording medium and the crystallinity (crystal grain diameters and orientation dispersion) of the magnetic recording layer of the medium can be improved. However, in the case of the perpendicular magnetic recording medium of comparison example 3, the OW value is sharply degraded compared with the perpendicular magnetic recording media of embodiments 1 through 5, and this is accompanied by an increase in media noise and a simultaneous decline in S/N be approximately 0.5 to 1 dB. This result indicates that due to the reduced write-ability (OW), an increase in media noise and decline in S/N have occurred. From the above results it is clear that by providing a second underlayer and making the second nonmagnetic intermediate layer a thin film, a perpendicular magnetic recording medium is obtained which has magnetic characteristics equal to those of a perpendicular magnetic recording medium having a single nonmagnetic intermediate layer of large film thickness, but which has improved electromagnetic transducing characteristics due to improved write-ability. Nonmagnetic intermediate layer materials, of which Ru is representative, are expensive compared with the soft magnetic layer materials used in the underlayer, and so by reducing the thickness of the nonmagnetic intermediate layers in this invention, the cost of the perpendicular magnetic recording medium can also be reduces.

Next, embodiments 6 through 8, having comparatively thick first nonmagnetic intermediate layers as well as a second underlayer, are compared with comparison example 3. The perpendicular magnetic recording medium of comparison example 3 has a coercive force $H_c$ equal to that of embodiments 6 through 8, and a somewhat larger $\Delta\theta_{50}$ value in the magnetic recording layer, but the crystal grain diameters are the same. The sums of the film thicknesses of nonmagnetic intermediate layers in embodiments 6 through 8 (the totals for the first nonmagnetic intermediate layer and second nonmagnetic intermediate layer) are 13 nm (embodiment 6) and 18 nm (embodiments 7 and 8), which are approximately equal to, or even larger than the 15 nm for comparison example 3. However, compared with comparison example 3, embodiments 6 through 8 have a an OW value which is superior by approximately 6 dB, and the S/N is also higher by 1 dB or more. This is an advantageous result of providing a second underlayer, having soft magnetic properties, between the first nonmagnetic intermediate layer and the second nonmagnetic intermediate layer; it is thought that the OW is not degraded between the second underlayer functions as a soft magnetic backing layer during high-density recording. Based on the above results, it is clear that even when the first nonmagnetic intermediate layer is comparatively thick, by providing a second underlayer, the medium write-ability is not worsened. Further, although the total thickness of nonmagnetic intermediate layers is large, rather than using thick layers of expensive Ru, it is possible to reduce the thickness of Ru and use inexpensive Co-base alloys in its place, so that medium costs can simultaneously be reduced.

As described above, using a medium configuration of this invention, the orientation dispersion in the magnetic recording layer was reduced and magnetic isolation of magnetic crystal grains in the magnetic recording layer was promoted, and by reducing the grain sizes of magnetic crystal grains, noise was reduced and the S/N ratio improved. Also, the nonmagnetic intermediate layer film thickness was decreased, the distance between the soft magnetic film and the head shortened, and write-ability of the perpendicular magnetic recording medium was improved. And, by reducing the film thickness of nonmagnetic intermediate layers, costs were simultaneously reduced as well.

What is claimed is:

1. A perpendicular magnetic recording medium, comprising:
    a nonmagnetic substrate;
    a first underlayer provided on the nonmagnetic substrate;
    a first nonmagnetic intermediate layer provided on the first underlayer;
    a second underlayer provided on the first nonmagnetic intermediate layer;
    a second nonmagnetic intermediate layer provided on the second underlayer; and
    a magnetic recording layer provided on the second nonmagnetic intermediate layer,
    wherein the first underlayer comprises a soft magnetic material which has a face-centered cubic structure and which includes at least Ni and Fe, and
    wherein the second underlayer comprises a soft magnetic material which has a face-centered cubic structure and which includes at least Co.

2. The perpendicular magnetic recording medium according to claim 1, wherein the first underlayer comprises 30-88 at % Ni and 0.1-22 at % Fe where the total number of atoms constituting the first underlayer is taken as reference.

3. The perpendicular magnetic recording medium according to claim 1, wherein the first underlayer further comprises at least one material selected from the group consisting of Co, Si, B, Nb, N, Ta, Al, Pd, Cr, and Mo.

4. The perpendicular magnetic recording medium according to claim 1, wherein the first nonmagnetic intermediate layer includes a metal selected from the group consisting of V, Cr, Cu, Nb, Mo, Ru, Rh, Ta, W, Re, and Ir, or an alloy having a main constituent which is at least one metal selected from the group consisting of V, Cr, Cu, Nb, Mo, Ru, Rh, Ta, W, Re, and Ir.

5. The perpendicular magnetic recording medium according to claim 1, wherein the first nonmagnetic intermediate layer comprises a nonmagnetic alloy including at least Co.

6. The perpendicular magnetic recording medium according to claim 1, wherein the first nonmagnetic intermediate layer has a thickness ranging between 0.1 nm and 2 nm.

7. The perpendicular magnetic recording medium according to claim 1, wherein the first nonmagnetic intermediate layer has a thickness ranging between 3 nm and 15 nm.

8. The perpendicular magnetic recording medium according to claim 1, wherein the second underlayer further comprises at least one material selected from the group consisting of Fe, B, Al, Zr, Mg, and Si.

9. The perpendicular magnetic recording medium according to claim 8, wherein the second underlayer comprises 10 at % or less Fe, 50 at % or less B, 40 at % or less Al, 15 at % or less Zr, 52 at % or less Mg, or 33 at % or less Si where the total number of atoms constituting the second underlayer is taken as reference.

10. The perpendicular magnetic recording medium according to claim 1, wherein the second underlayer further comprises one of O or N.

11. The perpendicular magnetic recording medium according to claim 1, wherein the second nonmagnetic intermediate layer comprises one of Ru or a Ru-base alloy.

12. The perpendicular magnetic recording medium according to claim 1, wherein the second nonmagnetic intermediate layer has a thickness ranging between 0.1 nm and 20 nm.

13. The perpendicular magnetic recording medium according to claim 1, wherein the magnetic recording layer comprises a material having a granular structure in which magnetic crystal grains are dispersed in a matrix comprised of one of a nonmagnetic oxide or a nonmagnetic nitride.

14. The perpendicular magnetic recording medium according to claim 1, further comprising a soft magnetic backing layer provided between the nonmagnetic substrate and the first underlayer.

15. The perpendicular magnetic recording medium according to claim 1, further comprising a protective film provided on the magnetic recording layer.

16. The perpendicular magnetic recording medium according to claim 1, further comprising a liquid lubricant layer provided on the protective film.

* * * * *